US011150817B2

(12) United States Patent
Waddington

(10) Patent No.: US 11,150,817 B2
(45) Date of Patent: Oct. 19, 2021

(54) INTEGRATING KERNEL-BYPASS USER-LEVEL FILE SYSTEMS INTO LEGACY APPLICATIONS

(71) Applicant: International Business Machines Corporation, Armonk, NY (US)

(72) Inventor: Daniel Waddington, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/271,454

(22) Filed: Feb. 8, 2019

(65) Prior Publication Data

US 2020/0257459 A1    Aug. 13, 2020

(51) Int. Cl.
| | |
|---|---|
| *G06F 3/06* | (2006.01) |
| *G06F 16/17* | (2019.01) |
| *G06F 9/4401* | (2018.01) |
| *G06F 12/1081* | (2016.01) |

(52) U.S. Cl.
CPC ............ *G06F 3/0622* (2013.01); *G06F 3/067* (2013.01); *G06F 3/0655* (2013.01); *G06F 9/4406* (2013.01); *G06F 12/1081* (2013.01); *G06F 16/17* (2019.01); *G06F 2212/621* (2013.01)

(58) Field of Classification Search
CPC ...... G06F 3/0622; G06F 3/0655; G06F 3/067; G06F 16/17; G06F 9/4406; G06F 12/1081; G06F 2212/621
See application file for complete search history.

(56) References Cited

U.S. PATENT DOCUMENTS

| | | | |
|---|---|---|---|
| 5,432,908 A | * | 7/1995 | Heddes ................. G06F 5/06 370/412 |
| 6,606,685 B2 | | 8/2003 | Huxoll |
| 8,612,536 B2 | | 12/2013 | Pope et al. |
| 9,588,771 B2 | | 3/2017 | Wang et al. |
| 9,658,878 B2 | | 5/2017 | Ports et al. |
| 9,697,034 B2 | | 7/2017 | Chadha et al. |
| 2005/0183093 A1 | * | 8/2005 | Pope ................. G06F 13/385 719/314 |
| 2008/0072236 A1 | * | 3/2008 | Pope ................. H04L 45/00 718/108 |

(Continued)

FOREIGN PATENT DOCUMENTS

HU         E035812 T2        5/2018

OTHER PUBLICATIONS

Peter et al., "Arrakis: The Operating System Is the Control Plane," ACM Transactions on Computer Systems, vol. 33, No. 4, Article 11, Nov. 2015, 30 pages.

(Continued)

*Primary Examiner* — Nanci N Wong
(74) *Attorney, Agent, or Firm* — Zilka-Kotab, P.C.

(57) ABSTRACT

A computer-implemented method according to one embodiment includes identifying a communication channel associated with a user-level stack within a user space of a system, establishing a user space communications path with the user-level stack, utilizing the communication channel and shared memory within the user space of the system, and redirecting one or more calls within the user space of the system to the user-level stack, utilizing the user space communications path.

24 Claims, 8 Drawing Sheets

(56) References Cited

U.S. PATENT DOCUMENTS

| | | | |
|---|---|---|---|
| 2012/0124121 A1* | 5/2012 | Pope | H04L 49/9094 |
| | | | 709/201 |
| 2012/0131375 A1 | 5/2012 | Adda et al. | |
| 2015/0089306 A1* | 3/2015 | Cardona | G06F 11/2046 |
| | | | 714/54 |

OTHER PUBLICATIONS

Steinberg et al., "NOVA: A Microhypervisor-Based Secure Virtualization Architecture," Proceedings of the 5th European Conference on Computer Systems, 2010, 14 pages.

Fox et al., "IBM's Shared Memory Communications over RDMA (SMC-R) Protocol (RFC7609)," IP.com Prior Art Database, Technical Disclosure No. IPCOM000242783D, Aug. 1, 2015, 287 pages.

Github, "The reference implementation of the Linux FUSE (Filesystem in Userspace) interface," GitHub, Inc., 2019, 3 pages, retrieved from https://github.com/libfuse/libfuse.

Leslie et al., "User-level Device Drivers: Achieved Performance," CiteSeer, 2005, 17 pages, retrieved from http://citeseerx.ist.psu.edu/viewdoc/summary?doi=10.1.1.59.6766.

SPDK, "Storage Performance Development Kit (SPDK)," 2 pages, retrieved on Jan. 30, 2019, from https://spdk.io/.

Kannan et al., "Designing a True Direct-Access File System with DevFS," Proceedings of the 16th USENIX Conference on File and Storage Technologies, Feb. 12-15, 2018, 16 pages.

OrangeFS, "The OrangeFS Project," orangefs.org, Jun. 2015, 4 pages, retrieved on Jan. 30, 2019, from http://www.orangefs.org/.

\* cited by examiner

INTEGRATING KERNEL-BYPASS USER-LEVEL FILE SYSTEMS INTO LEGACY APPLICATIONS

BACKGROUND

The present invention relates to operating system implementations, and more specifically, this invention relates to establishing and utilizing a user space communications path with a user-level stack of a system.

Input/output (I/O) bandwidth is constantly increasing. The I/O stack is necessary to provide software functionality needed to use underlying storage hardware. The I/O stack typically includes block device drivers, block caching, and file systems. However, traditional monolithic operating system designs rely on placement of the I/O stack in the kernel and thus require one or more system calls/context switches on each I/O. This results in degraded performance due to software overhead. Moving the I/O stack into user-space improves performance by eliminating the need to enter the kernel whatsoever. The de facto approach to integrating such a user-level architecture involves the manual re-writing of legacy applications to support direct APIs, which is time and resource-intensive. There is therefore a need to integrate user-level storage stacks into monolithic operating systems in an efficient manner.

SUMMARY

A computer-implemented method according to one embodiment includes identifying a communication channel associated with a user-level stack within a user space of a system, establishing a user space communications path with the user-level stack, utilizing the communication channel and shared memory within the user space of the system, and redirecting one or more calls within the user space of the system to the user-level stack, utilizing the user space communications path.

According to another embodiment, a computer program product for creating and implementing a user space communications path includes a computer readable storage medium having program instructions embodied therewith, where the computer readable storage medium is not a transitory signal per se, and where the program instructions are executable by a processor to cause the processor to perform a method including identifying, by the processor, a communication channel associated with a user-level stack within a user space of a system, establishing, by the processor, the user space communications path with the user-level stack, utilizing the communication channel and shared memory within the user space of the system, and redirecting, by the processor, one or more calls within the user space of the system to the user-level stack, utilizing the user space communications path.

According to another embodiment, a system includes a processor, and logic integrated with the processor, executable by the processor, or integrated with and executable by the processor, where the logic is configured to identify a communication channel associated with a user-level stack within a user space of the system, establish a user space communications path with the user-level stack, utilizing the communication channel and shared memory within the user space of the system, and redirect one or more calls within the user space of the system to the user-level stack, utilizing the user space communications path.

According to another embodiment, a computer-implemented method includes intercepting an initial file system call, sending the initial file system call to a user-level stack via a kernel space communications path, receiving a response to the initial file system call from the user-level stack via the kernel space communications path, extracting an inter-process communication (IPC) channel identifier from the response to the initial file system call, and establishing a user space communications path with the user-level stack within a user space of a system, utilizing the IPC channel and shared direct memory access (DMA) memory.

According to another embodiment, a computer-implemented method includes intercepting a file system call, identifying a read or write command within the file system call, identifying a file handle within the file system call, in response to identifying the read or write command, determining a user space communications path associated with the file handle, sending translating the file system call and sending the translated file system call to a user-level stack, utilizing the user space communications path, and receiving a response to the translated file system call from the user-level stack, utilizing the user space communications path.

Other aspects and embodiments of the present invention will become apparent from the following detailed description, which, when taken in conjunction with the drawings, illustrate by way of example the principles of the invention.

DETAILED DESCRIPTION

Figure 1:
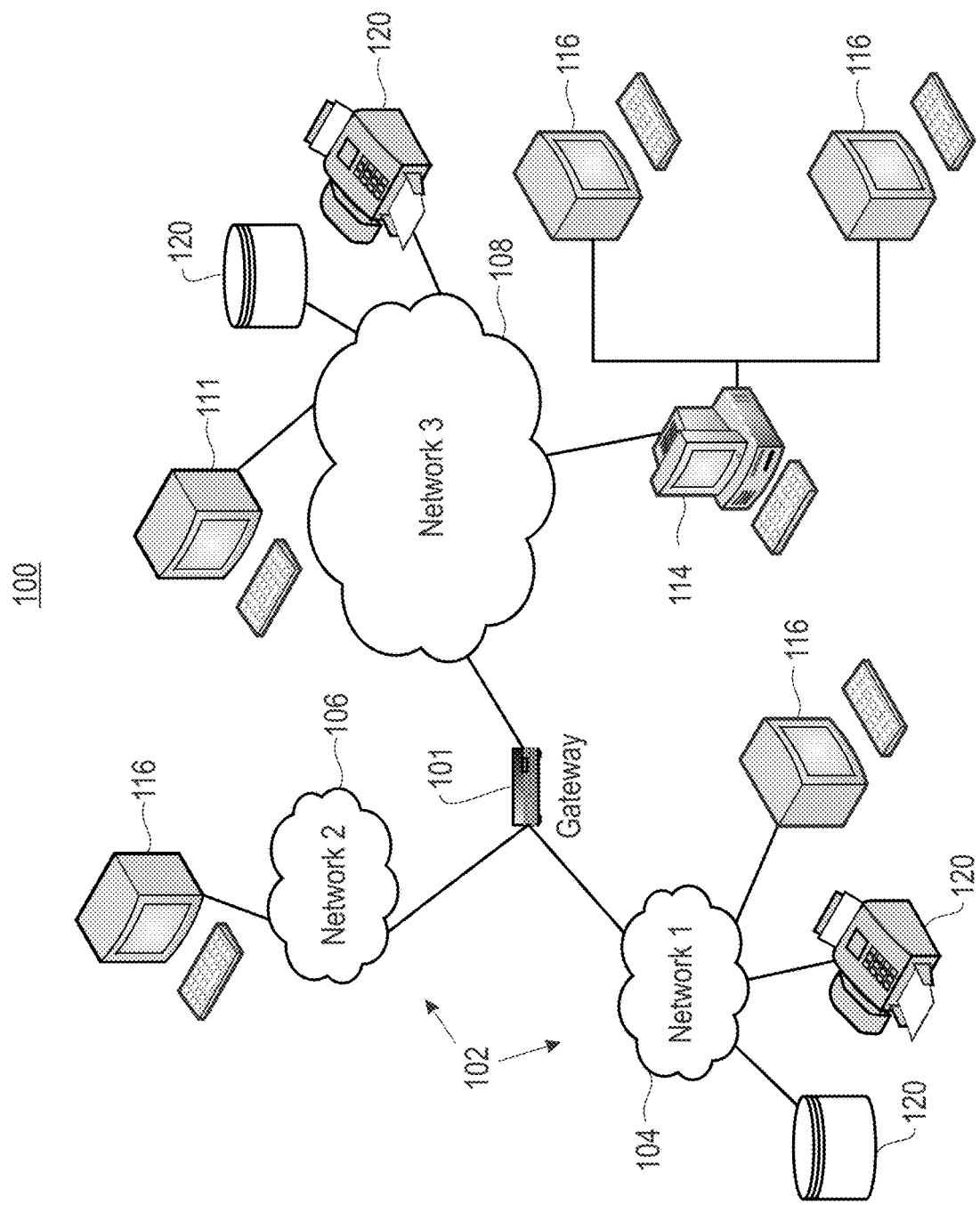
FIG. 1 illustrates a network architecture, in accordance with one embodiment.

The following description discloses several preferred embodiments of systems, methods and computer program products for creating and implementing a user space communications path. Various embodiments provide a method for establishing and implementing a user space communications path with a user-level I/O stack, utilizing a communication channel and a shared memory within a user space of a system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating and implementing a user space communications path.

In one general embodiment, a computer-implemented method includes identifying a communication channel associated with a user-level stack within a user space of a system, establishing a user space communications path with the user-level stack, utilizing the communication channel and shared memory within the user space of the system, and redirecting one or more calls within the user space of the system to the user-level stack, utilizing the user space communications path.

In another general embodiment, a computer program product for creating and implementing a user space communications path includes a computer readable storage medium having program instructions embodied therewith, where the computer readable storage medium is not a transitory signal per se, and where the program instructions are executable by a processor to cause the processor to perform a method including identifying, by the processor, a communication channel associated with a user-level stack within a user space of a system, establishing, by the processor, the user space communications path with the user-level stack, utilizing the communication channel and shared memory within the user space of the system, and redirecting, by the processor, one or more calls within the user space of the system to the user-level stack, utilizing the user space communications path.

In another general embodiment, a system includes a processor, and logic integrated with the processor, executable by the processor, or integrated with and executable by the processor, where the logic is configured to identify a communication channel associated with a user-level stack within a user space of the system, establish a user space communications path with the user-level stack, utilizing the communication channel and shared memory within the user space of the system, and redirect one or more calls within the user space of the system to the user-level stack, utilizing the user space communications path.

In another general embodiment, a computer-implemented method includes intercepting an initial file system call, sending the initial file system call to a user-level stack via a kernel space communications path, receiving a response to the initial file system call from the user-level stack via the kernel space communications path, extracting an inter-process communication (IPC) channel identifier from the response to the initial file system call, and establishing a user space communications path with the user-level stack within a user space of a system, utilizing the IPC channel and shared direct memory access (DMA) memory.

In another general embodiment, a computer-implemented method includes intercepting a file system call, identifying a read or write command within the file system call, identifying a file handle within the file system call, in response to identifying the read or write command, determining a user space communications path associated with the file handle, sending translating the file system call and sending the translated file system call to a user-level stack, utilizing the user space communications path, and receiving a response to the translated file system call from the user-level stack, utilizing the user space communications path.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
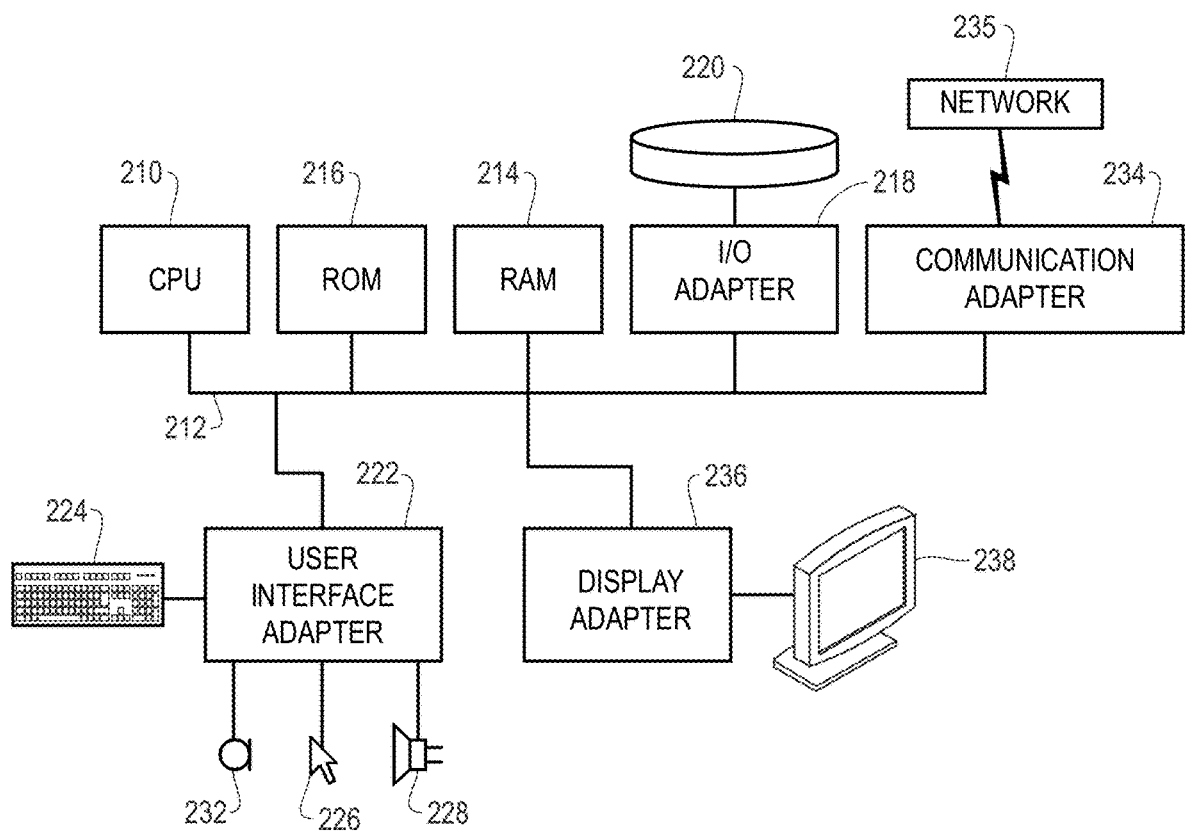
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
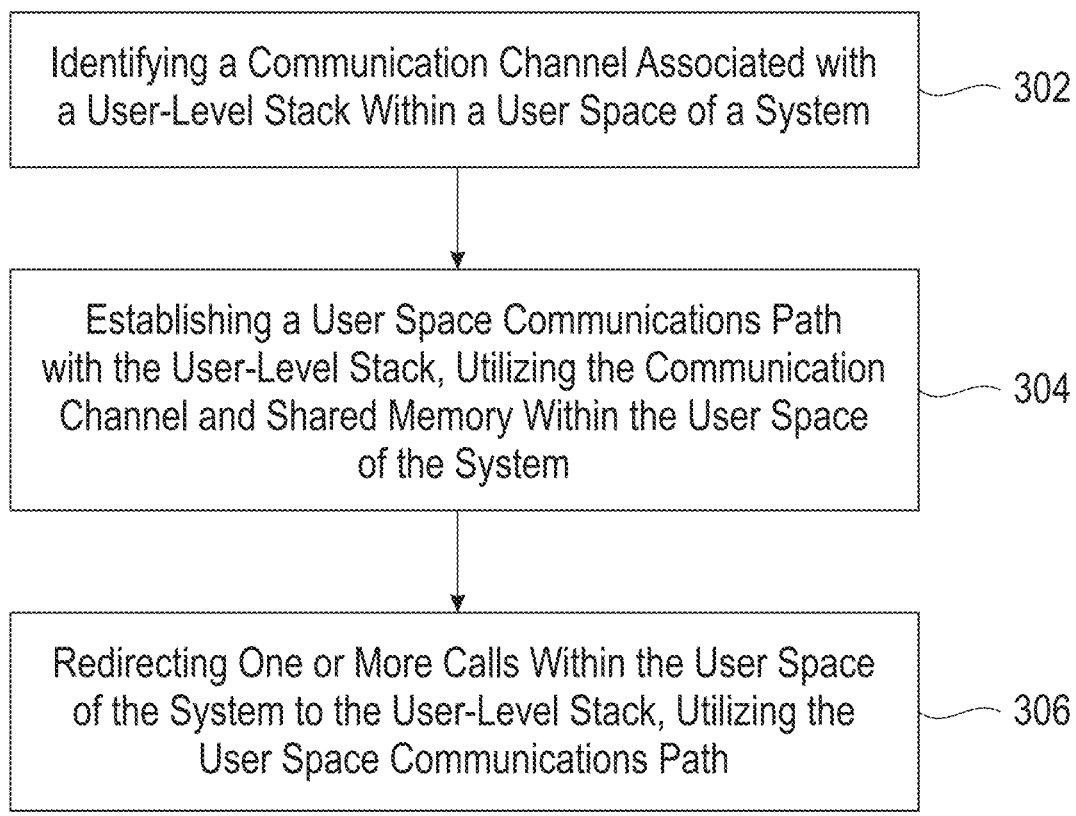
FIG. 3 illustrates a method for creating and implementing a user space communications path, in accordance with one embodiment.

Now referring to FIG. 3, a flowchart of a method 300 is shown according to one embodiment. The method 300 may be performed in accordance with the present invention in any of the environments depicted in FIGS. 1, 2, 7, and 8, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a communication channel associated with a user-level stack within a user space of a system is identified. In one embodiment, the communication channel may include an inter-process communication (IPC) channel that operates outside of the kernel by establishing a shared memory FIFO queue between processes. Initiation of this communication channel may be established by a predetermined layer (e.g., a function call interception layer) within a first process of the system.

For example, the first process may be implemented within the user space of the system. In another example, the user-level stack may be located within a second process that is implemented within the user space of the system.

Additionally, in one embodiment, the communication channel may be identified from a response to a file system call. For example, the file system call may include a file system call sent from an application within a first process that is intercepted by the predetermined layer. In another example, the file system call may be sent by the predetermined layer to the user-level stack of a second process via the kernel. In yet another example, the user-level stack may implement the file system call and send a response to the predetermined layer via the kernel. For instance, the user-level stack may include one or more device driver abstractions, file abstractions, storage abstractions, etc.

Further, in one example, the response to the file system call may be received from the user-level stack of the second process by the predetermined layer of the first process via the kernel. In another example, the response may be analyzed by the predetermined layer to determine the communication channel included within the response.

Further still, in one embodiment, the user space may include a first predetermined region of system memory within the system where user applications/processes run. For example, the user space may have a lower level of privilege when compared to kernel space of the system. In another example, predetermined system registers and privileged processor instructions may not be accessible in user space.

Also, in one embodiment, the kernel space may include a second predetermined region of system memory (e.g., memory and address space, etc.) within the system where the kernel (e.g., the core of an operating system implemented within the system, etc.) runs and provides its services. For example, the kernel space may have a higher level of privilege when compared to the user space of the system. In another example, threads running in kernel space may inspect any piece of system memory.

In addition, in one embodiment, the kernel space and the user space may be implemented within the system. For example, the system may include any computing system such as a server, client, mainframe device, node in multi-node environment, mobile device, etc.

Furthermore, method 300 may proceed with operation 304, where a user space communications path with the user-level stack is established, utilizing the communication channel and shared memory within the user space of the system. In one embodiment, the predetermined layer may set up a user space communications path between the user-level stack and the predetermined layer, utilizing the communication channel. In another embodiment, the predetermined layer may be located within a first process in user space, and the user-level stack may be located within a second process in user space, and the user space communications path may be used to send data to and from the first and second processes within the user space.

Further still, in one embodiment, the first and the second process may agree to share a predetermined portion of memory that can be used by Direct Memory Access (DMA) capabilities of the system. For example, the shared DMA memory may include memory for which direct memory access may be performed. In another embodiment, the first and second processes may then communicate via a user space communications path utilizing the predetermined portion of shared memory within the user space of the system, without having to invoke the kernel of the operating system.

In this way, a shared-memory IPC channel user space communications path may be created to facilitate data communication between processes in user space.

Also, in one embodiment, the predetermined layer may update a stored mapping, utilizing the communication channel. For example, the predetermined layer may store and maintain a mapping between file handles and communication channels. In another example, the predetermined layer may store an IPC channel associated with the communication channel in the mapping in association with a predetermined file handle (e.g., a file handle associated with the file system call, etc.).

Additionally, method 300 may proceed with operation 306, where one or more calls within the user space of the system are redirected to the user-level stack, utilizing the user space communications path. In one embodiment, the one or more calls may include file system calls within the system. For example, the file system calls may include one or more commands to perform one or more actions by the user-level stack.

Further, in one embodiment, the one or more calls may be sent from an application within the first process. In another embodiment, the one or more calls may be intercepted by the predetermined layer within the first process. In yet another embodiment, the one or more calls may be analyzed to determine a type of call. In still another embodiment, in response to determining that the intercepted call is a read or write call, the call may be redirected by the predetermined layer from a kernel space communications path to a user space communications path, such that the call is sent to the user-level stack via the user space of the system, utilizing the user space communications path, instead of the kernel space communications path.

Further still, in one embodiment, in response to determining that the intercepted call is a management call (e.g., a call to delete a file, move a file, rename a file, etc.), the call may be directed by the predetermined layer to the user-level stack via the kernel space of the system. For example, the call may be sent to a dynamic library within the first process, which sends the call to a virtual file system within the kernel space. In another example, the call is then sent from the virtual file system to a kernel module within the kernel space, which sends the call to the user-level stack in the user space.

Also, in one embodiment, one or more responses to the redirected calls may be received within the user space of the system from the user-level stack, utilizing the user space communications path. For example, in response to receiving a read call from an application of the first process, the user-level stack may read the requested data and may place the read data into a predetermined portion of shared memory (e.g., memory shared between the first process and the second process, etc.). In another example, the user-level stack may then send one or more pointers to the predetermined portion of the shared memory to the application of the first process within the user space of the system, utilizing the user space communications path.

In this way, the predetermined layer may establish a user space communications path between an application (running within a first process) and a user-level stack (running within a second process) within the system, where the user space communications path is implemented within the user space of the system. Read and write calls of the first process may be implemented by the second process utilizing this user space communications path, while management calls of the first process may be implemented utilizing another user space communications path implemented within the kernel of the system (e.g., a kernel space communications path, etc.).

As a result, a management view of the user-level stack may be maintained by the system kernel, while non-management calls between applications and the user-level stack may be implemented in user space instead of kernel space, which may improve a performance of the system by reducing a latency of such communications, increasing a throughput of the system, improving a scalability of the system, etc.

Figure 4:
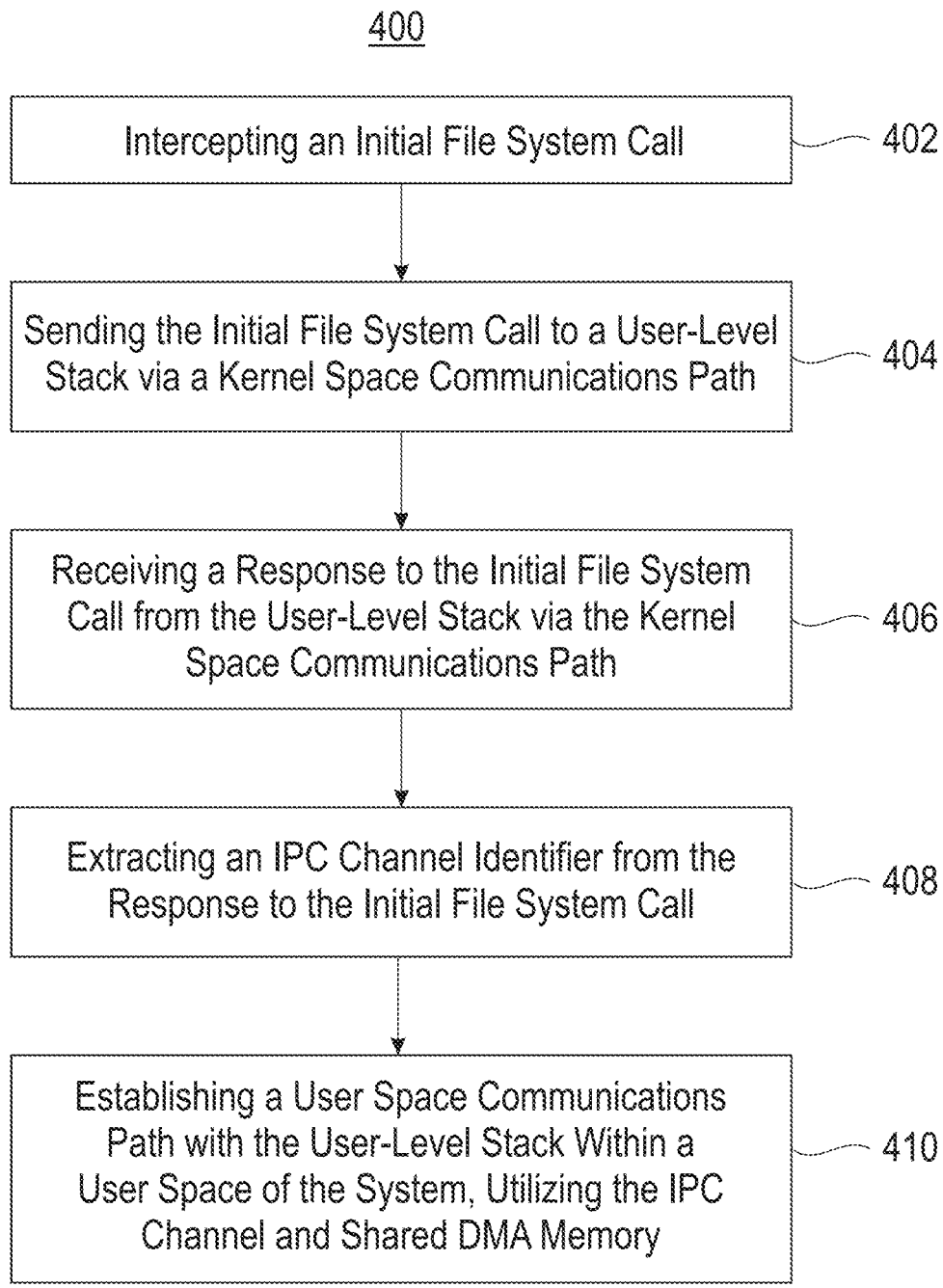
FIG. 4 illustrates a method for establishing a user space communications path, in accordance with one embodiment.

Now referring to FIG. 4, a flowchart of a method 400 for establishing a user space communications path is shown according to one embodiment. The method 400 may be performed in accordance with the present invention in any of the environments depicted in FIGS. 1, 2, 7, and 8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an initial file system call is intercepted. In one embodiment, the initial file system call may include a first file system call associated with a session. In another embodiment, the initial file system call may include a call to open a file, a call to create a file, etc. In yet another embodiment, initial file system call may be sent from an application within a first process. In still another embodiment, the initial file system call may be intercepted by an interception layer within the first process in a user space of a system (e.g., utilizing one or more standard data interception techniques, hooks, etc.).

Additionally, method 400 may proceed with operation 404, where the initial file system call is sent to a user-level stack via a kernel space communications path. In one embodiment, the initial file system call may be sent by the interception layer to a dynamically linked library within the first process in the user space of the system. In another embodiment, the dynamically linked library may forward the initial file system call to a virtual file system coordinator within the kernel space of the system.

Further, in one embodiment, the virtual file system may then forward the initial file system call to a kernel module (e.g., a Linux FUSE kernel module, etc.) within a kernel space of the system. In another embodiment, the kernel module may then forward the initial file system call to a library within a second process in the user space of the system (e.g., a Linux FUSE library, etc.). In yet another embodiment, the library may then forward the initial file system call to the user-level stack within the second process in the user space of the system. In still another embodiment, the user-level stack may then implement the command indicated within the initial file system call, and may provide a response to the initial file system call to the interception layer of the first process.

Further still, method 400 may proceed with operation 406, where a response to the initial file system call is received from the user-level stack via the kernel space communications path. In one embodiment, the response may be sent from the user-level stack to the library, from the library to the kernel module, from the kernel module to the virtual file system, from the virtual file system to the dynamically linked library, and from the dynamically linked library to the interception layer.

Also, method 400 may proceed with operation 408, where an IPC channel identifier is extracted from the response to the initial file system call. In one embodiment, the response may include an indication that the initial file system call has been completed at the user-level stack. In another embodiment, the response may include an identification of a user-level IPC channel to use for future calls associated with the session associated with the initial file system call.

In addition, method 400 may proceed with operation 410, where a user space communications path with the user-level stack is established within a user space of the system, utilizing the IPC channel and shared DMA memory. In one embodiment, the interception layer may update a stored mapping (e.g., a table, etc.) to include a mapping between a file handle and the IPC channel associated with the established user space communications path. In another embodiment, the interception layer may extract the file handle from the intercepted initial file system call (e.g., the file handle may be part of the initial file system call). In yet another embodiment, the interception layer may establish the user space communications path using one or more known communications path establishment techniques.

In this way, subsequent file calls received by the interception layer that include a read and/or write, as well as the file handle, may be converted into commands (e.g., read and/or write commands, etc.) and may be sent from the interception layer to the user-level stack via the user space communications path within the user space of the system.

Figure 5:
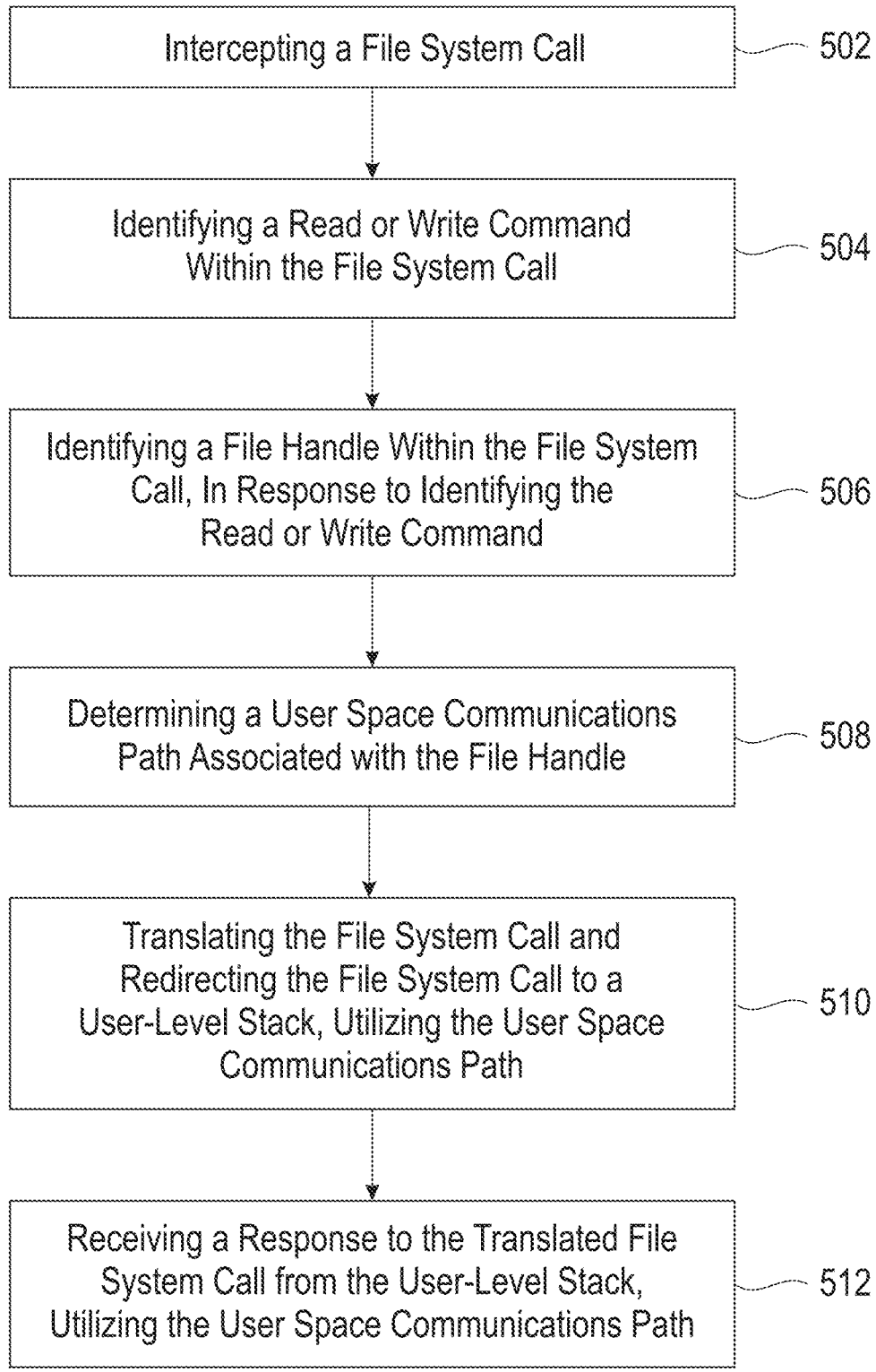
FIG. 5 illustrates a method for utilizing a user space communications path, in accordance with one embodiment.

Now referring to FIG. 5, a flowchart of a method 500 for utilizing a user space communications path is shown according to one embodiment. The method 500 may be performed in accordance with the present invention in any of the environments depicted in FIGS. 1, 2, 7, and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a file system call is intercepted. In one embodiment, the file system call may be sent from an application within a first process. In another embodiment, the file system call may be intercepted by an interception layer within the first process. In still another embodiment, the file system call may be intercepted by an interception layer within the first process in a user space of a system (e.g., utilizing one or more standard data interception techniques, hooks, etc.).

Additionally, method 500 may proceed with operation 504, where a read or write command is identified within the file system call. For example, the interception layer may analyze the file system call to determine one or more commands within the call, as well as the types of those commands. In one embodiment, the read command may include a request to read data. In another embodiment, the write command may include a request to write data.

Further, method 500 may proceed with operation 506, where a file handle is identified within the file system call, in response to identifying the read or write command. For example, the interception layer may parse the file system call to determine the file handle located within the file system call. Further still, method 500 may proceed with operation 508, where a user space communications path associated with the file handle is determined. In one embodiment, the interception layer may maintain a stored mapping that includes a mapping between file handles and IPC channels associated with user space communications paths.

Also, in one embodiment, the interception layer may compare the file handle to the stored mapping in order to determine an IPC channel associated with a user space communications path that is mapped to the file handle within the stored mapping. In another embodiment, the user space communications path may utilize the IPC channel associated with the user space communications path.

In addition, method 500 may proceed with operation 510, where the file system call is translated and redirected to a user-level stack, utilizing the user space communications path. In one embodiment, the file system call may be translated by the translation layer into a read or write command. In another embodiment, the read or write command may be sent by the translation layer to the user-level stack via the IPC channel associated with the user space communications path. In yet another embodiment, a user space communications path is not identified within the stored mapping, the read or write command may be sent to the user-level stack via a kernel space communications path.

Furthermore, method 500 may proceed with operation 512, where a response to the translated file system call from the user-level stack is received, utilizing the user space communications path. In one embodiment, if the file system call includes a read command, the response to the file system call may include a pointer to shared memory where the requested read data is located. In another embodiment, if the file system call includes a write command, the response to the file system call may include a write confirmation. In yet another embodiment, the file system call may be received by the interception layer utilizing one or more known techniques.

In this way, a user space communications path, and not a kernel space communications path, may be used to transmit file system calls that include read or write commands.

Figure 6:
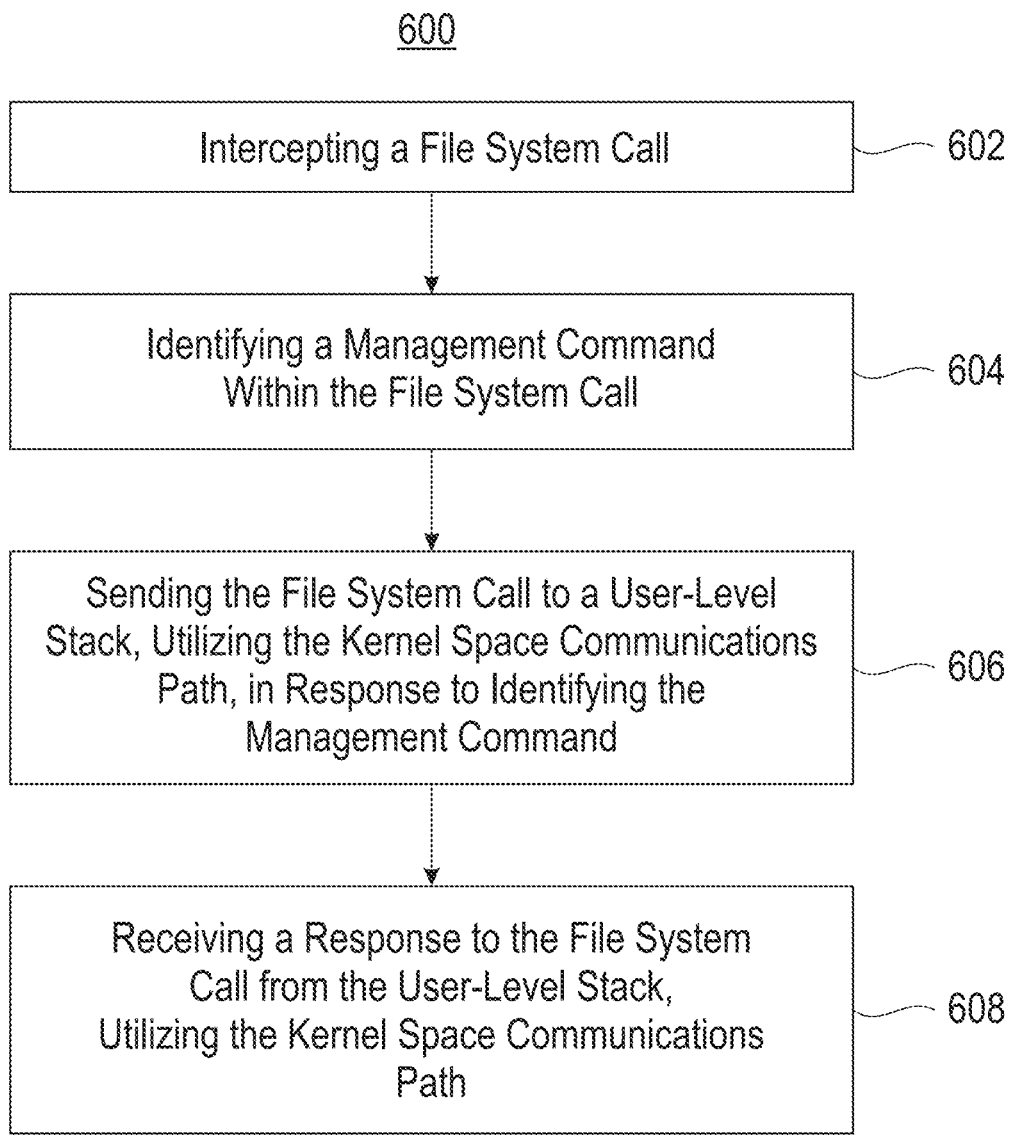
FIG. 6 illustrates a method for utilizing a kernel space communications path, in accordance with one embodiment.

Now referring to FIG. 6, a flowchart of a method 600 for utilizing a kernel space communications path is shown according to one embodiment. The method 600 may be performed in accordance with the present invention in any of the environments depicted in FIGS. 1, 2, 7, and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a file system call is intercepted. In one embodiment, the file system call may be sent from an application within a first process. In another embodiment, the file system call may be intercepted by an interception layer within the first process.

Additionally, method 600 may proceed with operation 604, where a management command is identified within the file system call. In one embodiment, the management command may include a request to create or remove a directory, delete a file, move a file, rename a file, etc.

Further, method 600 may proceed with operation 606, where the file system call is sent to a user-level stack, utilizing a kernel space communications path, in response to identifying the management command. In one embodiment, the file system call may be translated into a management command. In another embodiment, the management command may be sent to the user-level stack via the kernel space communications path, in a manner similar to that shown in at least operation 404 of FIG. 4.

Further still, method 600 may proceed with operation 608, where a response to the file system call is received from the user-level stack, utilizing the kernel space communications path. In one embodiment, the response to the file system call may include a confirmation that the management command was performed. In another embodiment, the management command may be received from the user-level stack via the kernel space communications path, in a manner similar to that shown in at least operation 406 of FIG. 4.

In this way, a kernel space communications path may be used to transmit file system calls that include management commands, such that a system kernel maintains a consistent view of the management structure of the file system.

Figure 7:
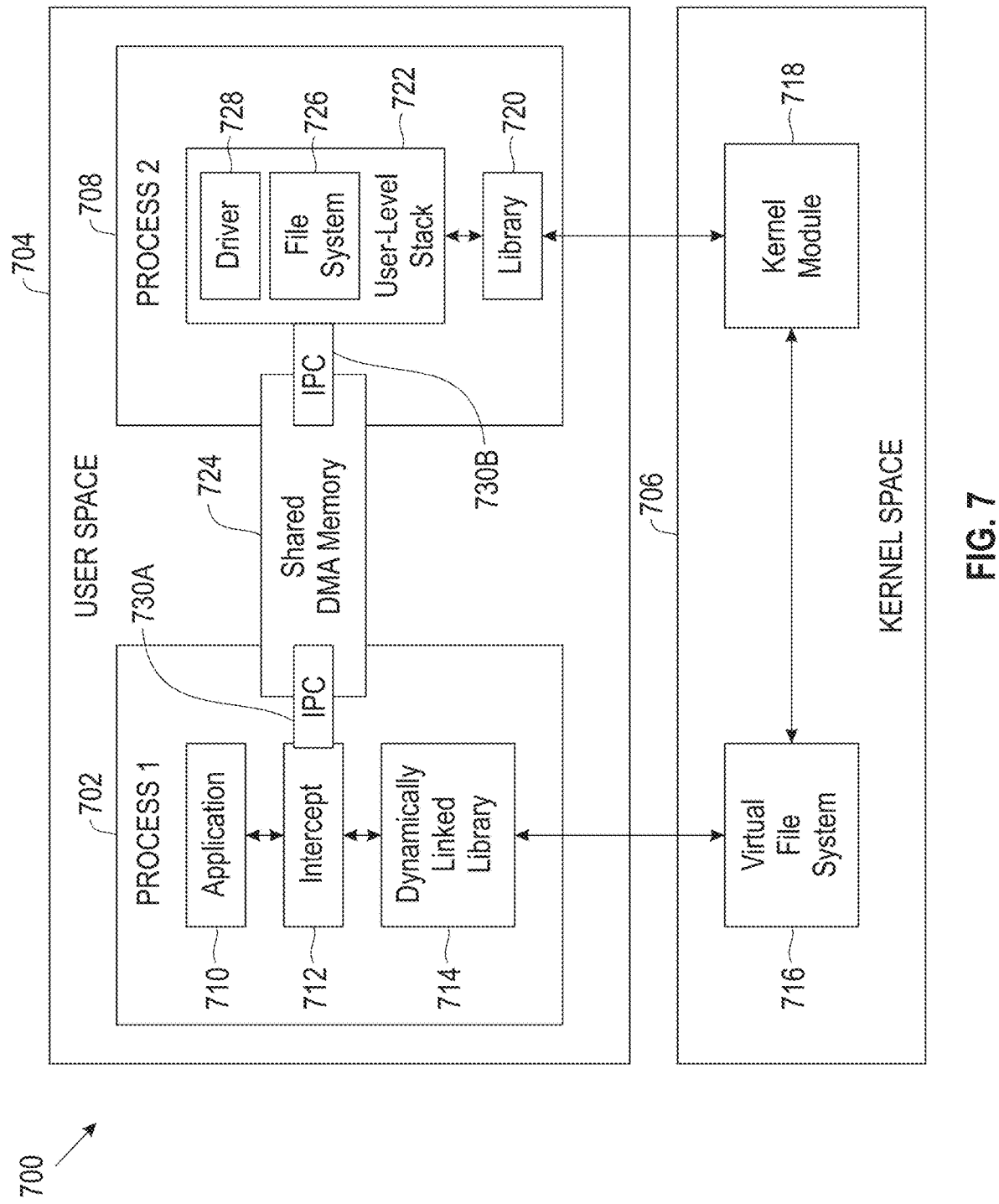
FIG. 7 illustrates an exemplary operating system environment, in accordance with one embodiment.

FIG. 7 illustrates an exemplary operating system environment 700, according to one exemplary embodiment. As shown, the operation system environment 700 includes both a user space 704 and a kernel space 706. Additionally, a first process 702 and a second process 708 are located within the user space 704 of the operating system environment 700. The first process 702 and the second process 708 may each represent different executions that have separate memory spaces.

In one embodiment, an interception layer 712 of the first process 702 intercepts an initial file system call from an application 710 of the first process 702. In response to the interception, the interception layer 712 sends the initial file system call to a dynamically linked runtime library 714 of the first process 702. In response to receiving the initial file system call, the dynamically linked runtime library 714 forwards the initial file system call to a virtual file system within the kernel space 706 of the operating system environment 700.

Further, in one embodiment, the virtual file system 716 determines an appropriate file system for the initial file system call. For example, the virtual file system 716 may join all file systems together into a unified namespace. The virtual file system 716 then forwards the initial file system call, as well as an identifier of the appropriate file system (and other access details such as a process ID, etc.), to a kernel module 718 within the kernel space 706 of the operating system environment 700. The kernel module 718 then forwards the initial file system call to a library 720 within the second process 708 in the user space 704 of the operating system environment 700.

Further still, in one embodiment, the library 720 may include one or more means to hook into the kernel module 718. The library 720 then forwards the initial file system call to the user-level stack 722 within the second process 708 in the user space 704 of the operating system environment 700 (e.g., utilizing one or more established hooks, etc.). The user-level stack 722 includes a file system 726 (e.g., a key-value store, etc.) and a driver 728 (e.g., a block device driver, etc.), and implements the command indicated within the initial file system call.

Also, in one embodiment, the user-level stack 722 then provides a response to the initial file system call to the library 720, which forwards the response to the kernel module 718. The kernel module 718 then forwards the response to the virtual file system 716, and the virtual file system 716 forwards the response to the dynamically linked runtime library 714. The dynamically linked runtime library 714 then forwards the response to the interception layer 712.

In addition, in one embodiment, upon receiving the response, the interception layer 712 extracts an IPC channel identifier from the response to the initial file system call. The interception layer then establishes a user space communications path to the user-level stack 722, utilizing the IPC channel 730A-B matching the IPC channel identifier extracted from the response that is implemented via shared DMA memory 724.

For example, the IPC channel 730A-B may enable direct communication between the first process 702 and the second process 708 in the user space 704. The first process 702 and the second process 708 may agree to share the shared DMA memory 724, and may then communicate with each other via the shared DMA memory 724 in user space 704 without having to go through the kernel space 706. The user space communications path therefore constitutes a user-level shared-memory IPC channel, which is distinct from an IPC channel that goes through the kernel space 706 (e.g., a POSIX IPC channel, etc.).

Furthermore, in one embodiment, the interception layer 712 extracts a file handle from the intercepted initial file system call, and updates a stored mapping at the interception layer 712 to include a mapping between the extracted file handle and the IPC channel identifier associated with the established user space communications path.

Further still, in one embodiment, the interception layer 712 of the first process 702 intercepts a second file system call from the application 710 of the first process 702. The second file system call may be sent after the initial file system call. In response to intercepting the second file system call, the interception layer 712 identifies a read or write command within the second file system call.

Also, in response to identifying the read or write command, the interception layer 712 identifies a file handle within the second file system call. The interception layer 712 then compares the identified file handle to the stored mapping in order to determine an IPC channel 730A-B associated with a user space communications path that is mapped to the file handle within the stored mapping. The interception layer 712 then translates the second file system call into a read or write command (corresponding to the command identified within the second file system call), and sends the read or write command to the user-level stack 722 via the IPC channel 730A-B.

Additionally, in one embodiment, the interception layer 712 of the first process 702 intercepts a third file system call from the application 710 of the first process 702. The third file system call may be sent after the initial file system call. In response to intercepting the third file system call, the interception layer 712 identifies a management command within the third file system call.

Further, in response to identifying the management command, the interception layer 712 translates the third file system call into the corresponding management command and sends the management command to the user-level stack 722 via the kernel space 706, in the same manner the initial file system call is sent to the user-level stack 722. A response to the management command may be sent from the user-level stack 722 to the interception layer 712 via the kernel space 706 as well.

Method to Integrate User-Level Storage Stacks into Monolithic

Operating Systems

High-performance network and storage devices are driving input/output (I/O) bandwidths to multiple millions of I/O operations per second (IOPS). Traditional monolithic operating system designs, that rely on placement of device drivers in the kernel and thus require one or more system calls/context switches on each I/O, significantly degrade performance of these new devices as a consequence of software overhead. The high-performance storage communities are turning towards "user-level" device driver frameworks (e.g., Intel SPDK) that allow the whole I/O stack (including the device driver itself) to be relocated into user-space. This allows applications (also in user space) to interact with the I/O stack directly via shared memory, thus avoiding the cost of context switches and cache pollution incurred by traditional monolithic kernel designs.

One problem with this approach is the integration of user-level I/O stacks with both existing (legacy) applications and existing (kernel-based) file systems. The de facto approach is that applications need to be re-written to support new direct APIs (replacing traditional system calls) and that the storage devices are managed separately.

In one embodiment, the problem of user-level I/O stack integration may be addressed from the perspective of both legacy applications and coherent management with kernel-based I/O stacks.

Exemplary Overview

In one embodiment, integration of user-level I/O stacks with existing (legacy) applications may be performed without the need to rewrite or recompile the application itself.

In another embodiment, integration may be enabled while still retaining the performance advantages of user-level I/O stacks.

In yet another embodiment, user-level I/O stacks may be integrated into an existing (monolithic) management plane, for example so that it can be "viewed" as a conventional file system. Management operations such as create, delete, dir, mv, rename, etc. can be performed through the existing POSIX-based APIs. For example, the command shell can be used to inspect the user-level I/O stack.

Exemplary Embodiment

Figure 8:
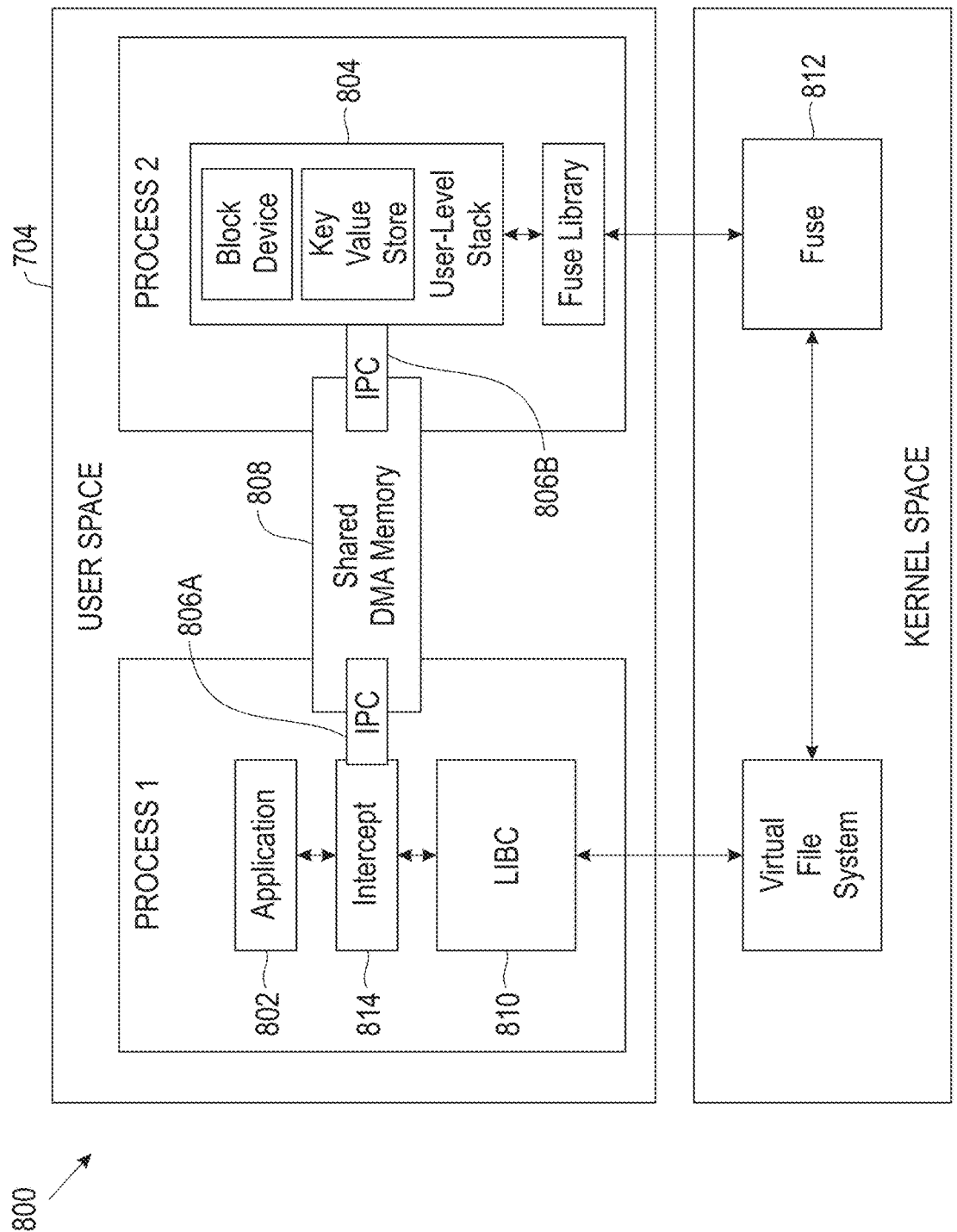
FIG. 8 illustrates an exemplary user-level storage stack integration environment, in accordance with one embodiment.

FIG. 8 illustrates an exemplary user-level storage stack integration environment 800, in accordance with one embodiment. In one embodiment, an application process 802 is separate from a user-level I/O stack process 804. The user-level I/O stack includes some combination of device driver, caches, file and storage abstractions (e.g. key-value store).

In another embodiment, the data, control (e.g., read/write command) and management planes may be separated. For example, the data and control planes are maintained through shared memory from user-level process to user-level process. I/O commands (e.g., read and write) are passed through shared-memory lock-free queues 806A-B (e.g., user-level IPCs, etc.). This enables applications to exchange messages without incurring a kernel system call or context switch. Data is exchanged through shared memory 808 that is established through the control channel implemented by the lock-free queues 806A-B.

In one embodiment, the control and data planes are thus secured through virtual memory mechanisms that are ultimately configured and controlled by the kernel. Data is exchanged through shared memory that is typically DMA capable (e.g., pinned) and allocated by the user-level I/O stack process. Thus, only the client process and the user-level I/O stack process can access this shared memory. Furthermore, making the shared memory DMA capable (pinned and aligned) allows the user-level I/O stack to perform zero-copy DMA-based direct transfer of data from the storage device directly into the client application's user-space. Consequently, performance is improved.

In another embodiment, the management plane is directed to existing kernel-based user-level integration methods (e.g. for Linux FUSE). For example, FUSE allows one to write a user-level file-system that is integrated into the kernel-level Virtual File System and thus treated in the same manner as any other kernel-based file system. The FUSE architecture works by intercepting I/O system calls in the kernel and redirecting the commands and data flow to a user-level daemon (known as the FUSE daemon).

In one embodiment, FUSE (or an equivalent) may be used to "present" the user-level I/O stack to the existing management plane. For example, only the management plane is redirected through FUSE (a.k.a. the slow path). Control and data are maintained with the user-space, faster, communications path (a.k.a. the fast path).

In another embodiment, the invention uses a transparent intercept approach to redirect command and data from the three planes. This is, in an exemplary embodiment, implemented as a dynamic function call overload, e.g., via LD PRELOAD on Linux. Function call overload works by overriding the dynamic linking of an application to the system runtime (e.g., libc 810), enabling a custom library to be transparently "hooked" into the application. There is no need for the application to be recompiled.

In one embodiment, the interception works by allowing all management plane calls to be forward to the kernel/FUSE module 812. In one exemplary FUSE design, the user-level stack does not know about the kernel-allocated file handle. The control and data planes are triggered after a file open call (libc). The open call propagates from the application process 802 through the kernel/FUSE module 812 to the user-level I/O stack process 804. This process records that a file session has been opened on a specific file path (e.g. /X/foo). In the return direction, the file handle is returned from the kernel and passed back up to the intercept 814. The intercept 814 must maintain a table of open file handles that correspond to the user-level I/O stack as opposed to another kernel-based file system. To differentiate between handles corresponding to the user-level I/O stack and handles provided by the kernel, an IOCTRL (e.g., POSIX <sys/ioctl.h>) may be issued with the kernel-allocated file handle and a unique command number, e.g. GET_UL_HANDLE.

This unique command is only handled by the user-level I/O stack process 804 after redirection through the kernel/FUSE module 812. The intercept 814 performs this ioctl for every open call interception, irrespective of whether it is directed to the user-level I/O stack or not. If the kernel-returned file handle does not correspond to the user-level I/O stack, then the ioctl call will fail as "unhandled" by the corresponding VFS file system and will thus be easily identifiable as a conventional file system target.

Once the interceptor 814 has identified that a specific file handle corresponds to a session in the user-level I/O stack, it can then use this mapping to selectively redirect subsequent I/O control and data to the fast path. Control commands are exchanged through the user-level IPC, and data is exchanged through the DMA-enabled shared buffers 808.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying, within a response to an intercepted file system call, an inter-process communication (IPC) channel associated with a user-level stack within a user space of a system, including extracting an identifier of the IPC channel from the response to the intercepted file system call;
   establishing a user space communications path with the user-level stack, utilizing the IPC channel and shared direct memory access (DMA) memory within the user space of the system; and
   conditionally redirecting a call within the user space of the system to the user-level stack, utilizing the user space communications path.

2. The computer-implemented method of claim 1, wherein identifying the IPC channel associated with the user-level stack within the user space of a system includes:
   intercepting a file system call to the user-level stack sent from an application within a first process, where the user-level stack is located within a second process separate from the first process,
   sending the file system call to the user-level stack, via a kernel of an operating system,
   receiving, from the user-level stack, a response to the file system call via the kernel of an operating system, and
   analyzing the response to determine the IPC channel included within the response;
   wherein establishing the user space communications path with the user-level stack, utilizing the IPC channel and the shared DMA memory within the user space of the system, includes:
   implementing an agreement between the first process and the second process to share the shared DMA memory, utilizing the IPC channel, the shared DMA memory including a predetermined portion of memory that can be used by Direct Memory Access (DMA) capabilities of the system,
   wherein the first process and the second process communicate via the shared DMA memory within the user space of the system without having to invoke the kernel of the operating system;
   wherein conditionally redirecting the call within the user space of the system to the user-level stack, utilizing the user space communications path, includes:
   intercepting the call,
   in response to determining that the intercepted call is a read call, redirecting the read call from a kernel space communications path to the user space communications path,
   in response to determining that the intercepted call is a write call, redirecting the write call from the kernel space communications path to the user space communications path, and
   in response to determining that the intercepted call is a management call, directing the management call to the user-level stack via the kernel space communications path,
   wherein redirecting the read call from the kernel space communications path to the user space communications path includes:
   sending the read call to the user-level stack using the IPC channel, and
   receiving a response to the read call from the user-level stack, the response including a pointer to the shared DMA memory within the user space of the system where requested read data is located.

3. The computer-implemented method of claim 1, wherein identifying the IPC channel associated with the user-level stack within the user space of a system includes:
   intercepting a file system call to the user-level stack sent from an application within a first process, where the user-level stack is located within a second process separate from the first process,
   sending the file system call to the user-level stack, via a kernel of an operating system,
   receiving, from the user-level stack, a response to the file system call via the kernel of an operating system, and
   analyzing the response to determine the IPC channel included within the response.

4. The computer-implemented method of claim 1, wherein the user space communications path is established by a predetermined layer located within a first process in the user space, where the user-level stack is located within a second process in the user space, and the user space communications path is used to send data to and from the first and second processes within the user space.

5. The computer-implemented method of claim 1, wherein a first and second process communicate via the user space communications path utilizing a predetermined portion of the shared DMA memory within the user space of the system, without having to utilize a kernel space of the system.

6. The computer-implemented method of claim 1, wherein establishing the user space communications path with the user-level stack, utilizing the IPC channel and the shared DMA memory within the user space of the system, includes:
implementing an agreement between a first process and a second process to share the shared DMA memory, utilizing the IPC channel,
wherein the shared DMA memory includes a predetermined portion of memory that can be used by Direct Memory Access (DMA) capabilities of the system,
wherein the first process and the second process communicate via the shared DMA memory within the user space of the system without having to invoke a kernel of an operating system.

7. The computer-implemented method of claim 1, wherein the call is sent from an application within a first process, intercepted by a predetermined layer within the first process, and analyzed to determine a type of the call.

8. The computer-implemented method of claim 1, wherein in response to determining that the call is a read or write call, the call is redirected from a kernel space communications path to the user space communications path, such that the call is sent directly to the user-level stack via the user space of the system, utilizing the user space communications path.

9. The computer-implemented method of claim 1, wherein in response to determining that the call is a management call, the call is directed to the user-level stack via a kernel space of the system.

10. The computer-implemented method of claim 1, further comprising redirecting the call, and receiving one or more responses to the redirected call within the user space of the system from the user-level stack, utilizing the user space communications path.

11. The computer-implemented method of claim 1, wherein conditionally redirecting the call within the user space of the system to the user-level stack, utilizing the user space communications path, includes:
intercepting the call,
in response to determining that the intercepted call is a read call, redirecting the read call from a kernel space communications path to the user space communications path,
in response to determining that the intercepted call is a write call, redirecting the write call from the kernel space communications path to the user space communications path, and
in response to determining that the intercepted call is a management call, directing the management call to the user-level stack via the kernel space communications path,
wherein redirecting the read call from the kernel space communications path to the user space communications path includes:
sending the read call to the user-level stack using the IPC channel, and
receiving a response to the read call from the user-level stack, the response including a pointer to the shared DMA memory within the user space of the system where requested read data is located.

12. A computer program product for creating and implementing a user space communications path, the computer program product comprising a computer readable storage medium having program instructions embodied therewith, wherein the computer readable storage medium is not a transitory signal per se, the program instructions executable by a processor to cause the processor to perform a method comprising:
identifying, within a response to an intercepted file system call by the processor, an inter-process communication (IPC) channel associated with a user-level stack within a user space of a system, including extracting an identifier of the IPC channel from the response to the intercepted file system call;
establishing, by the processor, the user space communications path with the user-level stack, utilizing the IPC channel and shared direct memory access (DMA) memory within the user space of the system; and
conditionally redirecting, by the processor, a call within the user space of the system to the user-level stack, utilizing the user space communications path.

13. The computer program product of claim 12, wherein identifying the IPC channel associated with the user-level stack within the user space of a system includes:
intercepting, by the processor, a file system call to the user-level stack sent from an application within a first process, where the user-level stack is located within a second process separate from the first process,
sending the file system call to the user-level stack, via a kernel of an operating system, by the processor,
receiving, from the user-level stack by the processor, a response to the file system call via the kernel of an operating system, and
analyzing, by the processor, the response to determine the IPC channel included within the response.

14. The computer program product of claim 12, wherein establishing the user space communications path with the user-level stack, utilizing the IPC channel and the shared DMA memory within the user space of the system, includes:
implementing, by the processor, an agreement between a first process and a second process to share the shared DMA memory, utilizing the IPC channel,
wherein the shared DMA memory includes a predetermined portion of memory that can be used by Direct Memory Access (DMA) capabilities of the system,
wherein the first process and the second process communicate via the shared DMA memory within the user space of the system without having to invoke a kernel of an operating system.

15. The computer program product of claim 12, wherein the user space communications path is established by a predetermined layer located within a first process in the user space, where the user-level stack is located within a second process in the user space, and the user space communications path is used to send data to and from the first and second processes within the user space.

16. The computer program product of claim 12, wherein a first and second process communicate via the user space communications path utilizing a predetermined portion of the shared DMA memory within the user space of the system, without having to utilize a kernel space of the system.

17. The computer program product of claim 12, further comprising updating a stored mapping, utilizing the IPC channel.

18. The computer program product of claim 12, wherein the call is sent from an application within a first process, intercepted by a predetermined layer within the first process, and analyzed to determine a type of the call.

19. The computer program product of claim 12, wherein in response to determining that the call is a read or write call, the call is redirected from a kernel space communications path to the user space communications path, such that the call is sent to the user-level stack via the user space of the system, utilizing the user space communications path.

20. The computer program product of claim 12, wherein in response to determining that the call is a management call, the call is directed to the user-level stack via a kernel space of the system.

21. The computer program product of claim 12, further comprising redirecting the call, and receiving one or more responses to the redirected call within the user space of the system from the user-level stack, utilizing the user space communications path.

22. A system, comprising:
a processor; and
logic integrated with the processor, executable by the processor, or integrated with and executable by the processor, the logic being configured to:
identify, within a response to an intercepted file system call, an inter-process communication (IPC) channel associated with a user-level stack within a user space of the system, including extracting an identifier of the IPC channel from the response to the intercepted file system call;
establish a user space communications path with the user-level stack, utilizing the IPC channel and shared direct memory access (DMA) memory within the user space of the system; and
conditionally redirect a call within the user space of the system to the user-level stack, utilizing the user space communications path.

23. A computer-implemented method, comprising:
intercepting an initial file system call to a user-level stack sent from an application within a first process, where the user-level stack is located within a second process separate from the first process;
sending the initial file system call to the user-level stack via a kernel space communications path;
receiving, from the user-level stack, a response to the initial file system call via the kernel space communications path;
extracting an identifier of an inter-process communication (IPC) channel from the response to the initial file system call; and
establishing a user space communications path with the user-level stack within a user space of a system, utilizing the IPC channel and shared direct memory access (DMA) memory.

24. A computer-implemented method, comprising:
identifying, within a response to an intercepted file system call, a communication channel associated with a user-level stack within a user space of a system;
establishing a user space communications path with the user-level stack, utilizing the communication channel and shared direct memory access (DMA) memory within the user space of the system; and
conditionally redirecting a call within the user space of the system to the user-level stack, utilizing the user space communications path, including:
intercepting the call,
in response to determining that the intercepted call is a read call, redirecting the read call from a kernel space communications path to the user space communications path, including sending the read call to the user-level stack using the communication channel, and receiving a response to the read call from the user-level stack, the response including a pointer to the shared DMA memory within the user space of the system where requested read data is located,
in response to determining that the intercepted call is a write call, redirecting the write call from the kernel space communications path to the user space communications path, and
in response to determining that the intercepted call is a management call, directing the management call to the user-level stack via the kernel space communications path.

* * * * *